3,134,390
SHEARABLE DISC BUTTERFLY VALVE
Harold D. Porter, Whittier, Calif., assignor to Futurecraft Corporation, City of Industry, Calif., a corporation of California
Filed Jan. 2, 1962, Ser. No. 163,795
3 Claims. (Cl. 137—68)

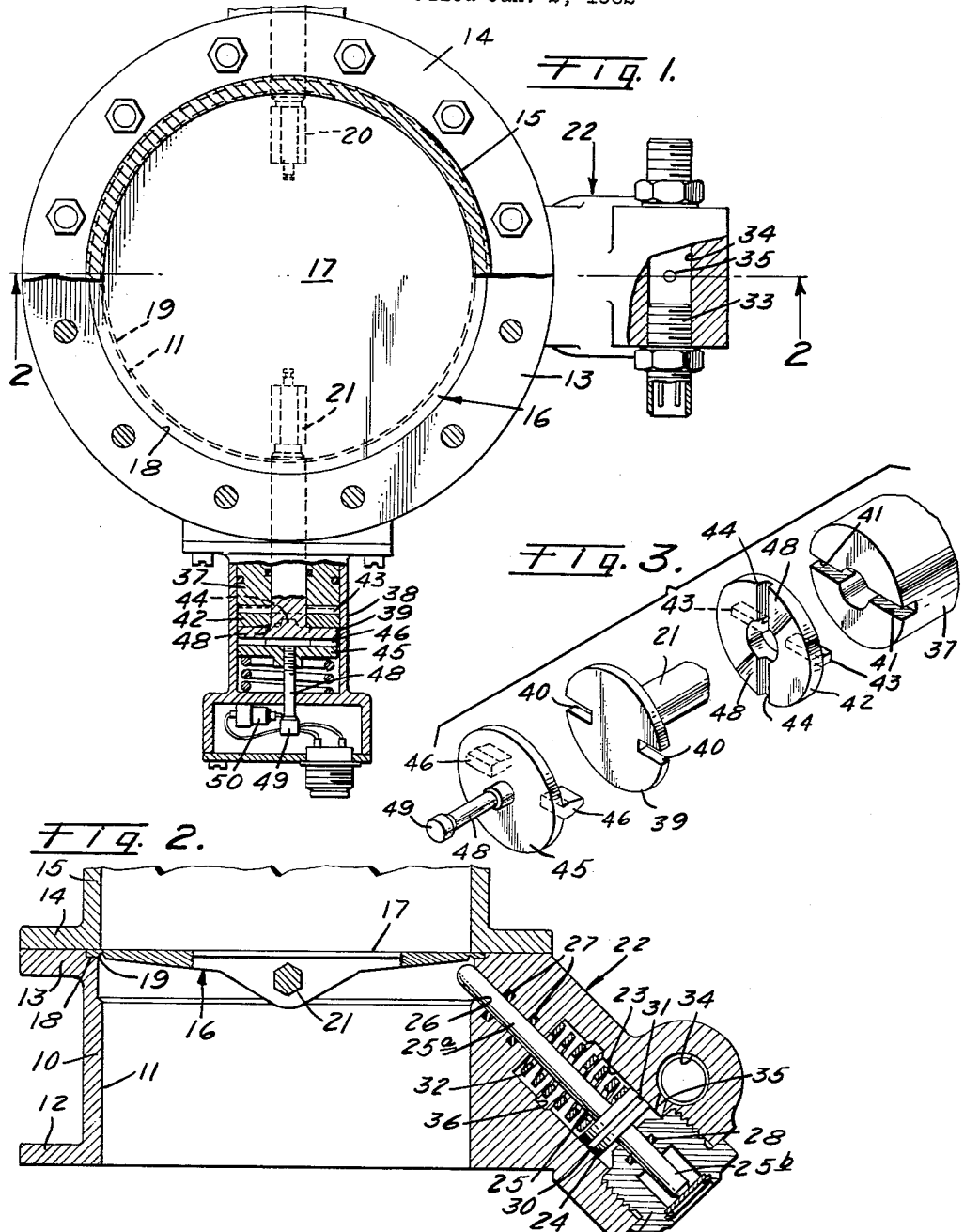

The present invention relates generally to control valves, and is more particularly concerned with valves of the character in which the valve parts are arranged to be sealed in closed position, but which may be unsealed and moved to opened position.

Valves of this character find use particularly in the storage of liquid fuels as well as other liquids, under conditions where it may be necessary to store the fuel for a considerable period of time. Such valves of necessity must be so constructed that there shall be no possibility of valve leakage due to deterioration of the valve parts, erosion of valve seats or other causes. On the other hand, when it is desired to utilize the stored liquid, the valve must be readily operable to opened position.

With the foregoing objectives in mind, it is one object of the present invention to provide a valve structure in which the valve member forms an integral barrier to the liquid flow, but which contains a frangible section which may be fractured to release a movable valve part for movement to an opened position.

A further object of the herein described invention is to provide a valve of the butterfly type in which the valve member is peripherally sealed in closed position within a flow passage, the valve member having a peripheral circumferentially extending frangible line which may be ruptured by valve opening forces.

Another object is to provide in a valve of the foregoing character, improved means for generating and controlling the valve opening forces.

Still another object is to provide in connection with such a valve, means for automatically latching it in opened position.

It is also an object to provide valve indicating means which will be responsive to the valve latching mechanism to indicate when the valve is in opened position.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a plan view of a valve structure embodying the features of the present invention, portions being cut away to show certain details of the locking mechanism;

FIG. 2 is a vertical transverse section through the same, taken substantially on line 2—2 of FIG. 1, and showing details of the impact force generating means; and FIG. 3 is an exploded view showing the component parts of the locking mechanism.

Referring generally to the drawings, for illustrative purposes, the valve of the present invention is shown as comprising a generally cylindrical body 10 which defines a cylindrical flow passage 11, this body being provided with end flanges 12 and 13 by means of which the valve structure may be mounted in a pipe run or secured to a connection flange, as shown at 14, of a liquid feed connection 15 from a storage container or other source.

The valve member, as generally indicated by the numeral 16, is of the butterfly type and comprises a disc 17 which has its peripheral margin seated within an annular groove 18 formed at the inner edge of the end flange 13. The peripheral margin of the disc is bonded to the valve body in the groove as by welding or other appropriate means which will provide a peripheral seal of the valve member. An epoxy sealing material may be utilized for this purpose. It will be observed that when the flange 13 is connected to a flange such as shown at 14, the flange 14 overlies the peripheral portion of the disc which is seated in the groove 18, thus aiding in clampingly retaining the periphery of the valve member.

The peripheral margin of the valve member, which is thus bonded and secured in sealed closed position forming a barrier to the passage 11, is inwardly bounded by a circumferentially extending V groove 19. This groove provides a circumferentially extending line of reduced thickness which is frangible and may be ruptured under the application of an impact force as will hereinafter be explained more fully.

Thus, the area of the disc 17 lying within the circumferentially extending V-groove 19 constitutes a butterfly valve which is pivotally supported for rotation about a diametrical axis upon suitable trunnion pivots 20 and 21 supported in the valve body 10. In the case of the pivot 21, it is of multisided construction, as shown in FIG. 2, where it connects with the valve member. Thus the pivot and valve member are connected for unitary rotational movement.

At right angles to the rotational axis of the valve disc 17, the body 10 is provided with a downwardly inclined projecting portion, as generally indicated by the numeral 22, which forms a housing for a squib gas generator and mechanism for applying an impact force against the valve member.

The projecting portion is provided with a cylindrical bore 23 which forms a cylinder within which there is reciprocably mounted a piston 24, this piston being constructed intermediate the ends of a piston rod 25. The piston rod has ends 25a and 25b which respectively project on opposite sides of the piston 24.

The bore 23 at its innermost end communicates with an axially aligned contracted passage 26 within which the end portion 25a of the piston rod is reciprocably mounted and sealed by sealing rings 27.

The other end 25b of the piston rod is supported for reciprocable movement and sealed by a sealing ring 28 in a removably mounted end cap 29 which thus forms a guide bushing for this end of the piston rod.

The piston 24 is sealed at its periphery by sealing ring 30 mounted in a groove 31 in the outer surface of the piston. A compression spring 32 normally biases the piston to a position in which the piston rod portion 25a is in a retracted position adjacent the V-groove 19. It will be appreciated that if the piston is now moved against the action of the spring 32, the end 25a of the piston rod will be forced into an extended position into impacted engagement with the disc 17. The piston is energized by means of an electrically fired squib gas generator 33 mounted in a chamber 34 provided in the projecting portion 22 of the valve body structure. The chamber 34 is connected through a bore passage 35 with the bore 23 so as to act on the piston in a direction to force it against the spring 32. The generated high pressure gas from the squib forces the piston rod end 25a with forceful impact sufficient to fracture the frangible portion in the V-groove 19 and move the disc 17 to an opened position.

In order to automatically return the piston to a position in which the piston rod end 25a will be retracted, the bore 23 is provided with a circumferentially extending groove 36 in its inner wall. When the piston 24 reaches the position of the groove 36, the gas pressure will force the sealing ring 30 to move outwardly radially into the groove 36 and thus break the peripheral seal around the piston. The piston is thereupon free to be moved under the force of the spring 32 to its retracted position.

Provision is made for locking the disc valve 17 in opened position and retaining it in this position against vibratory movement. The locking mechanism will now be described by reference to FIG. 1 and FIG. 3. The body 10 is formed with a tubular projection 37 which provides a bearing support for the outer end portion of the pivot 21. The locking mechanism is mounted within an auxiliary housing 38 and includes a disc 39 which is constructed with oppositely extending radial slots 40—40.

As best shown in FIG. 3, the outer end of the projection 37 is provided with oppositely extending radial grooves 41—41. Between this end of the projection 37 and the disc 39, there is provided an annular disc 42 which is centrally apertured to receive the pivot 21 therethrough. One side of the disc 42 is provided with radially oppositely extending ribs 43—43 which are adapted to mate with and extend into the grooves 41—41 and thus retain the disc 42 against rotation. The opposite side of the disc 42 is provided with oppositely extending radial grooves 44—44 which are circumferentially positioned in right angled relation to the ribs 43 as well as the slots 40.

A latching or locking member is provided in the form of a disc 45 which is positioned outwardly of disc 39 and provided on its confronting surface with oppositely extending radial ribs 46—46 which are adapted to extend into and through the slots 40—40 of the disc 39 with their innermost edges bearing against the outer surface of the annular disc 42. The disc 45 is normally biased and retained in this position by a compression spring 47. With the arrangement as thus described, it will be apparent that when the valve disc 17 is moved through an angle of 90° from its closed to opened position, the disc 39 will similarly rotate through an angle of 90° and carry the disc 45 through a similar angle to a position wherein the ribs 46 will register with the grooves 44—44 and be forced thereinto by the action of the spring 47. This will lock the disc 39 so as to retain the valve disc 17 in its opened position.

Entrance of the ribs 46—46 into the grooves 44—44 is facilitated by providing inclined approach ramps 48—48 on the approach surfaces to the grooves. Likewise a wedging action may be obtained between the outer edge of the ribs 46 and the grooves 44 by providing inwardly converging side walls for the grooves and ribs.

Advantage is taken of the axial movement of the disc 45 in going from unlatched to latched positions to operate a signalling device for indicating that the valve disc 17 is in opened position. For such purpose, the disc 45 is provided with an axially extending pin 48 having a cam head portion 49 which is operatively associated with the actuating member of a switch 50 which may be utilized to energize an indicating circuit when the valve disc 17 is in opened position.

Various modifiications may suggest themselves to those skilled in the art without departing from the spirit of my invention, and, hence, I do not wish to be restricted to the specific forms shown or uses mentioned, except to the extent indicated in the appended claims.

I claim:
1. A valve, comprising: a tubular body defining an axially extending passage; a valve member in said passage pivoted for movement to opened and closed positions with respect thereto; means sealing said valve in closed position including a frangible peripheral marginal area on said valve member; and means normally disconnected with respect to said valve member for applying upon energization a concentrated force against said valve in the frangible area for releasing said sealing means and moving said valve member to opened position, said force applying means being mounted on said body in a position adjacent to a portion of the peripheral frangible area to apply force to such portion.

2. A valve, comprising: a tubular body defining an axially extending passage; a valve member in said passage; pivot means mounting said valve member for movement between closed and opened positions with respect to said passage; means peripherally sealing said valve in closed position including a circumferentially extending frangible portion; means for applying a concentrated force against said valve in a limited part of said frangible portion for disrupting said sealing means and moving said valve member to opened position said force applying means being mounted on said body in a position adjacent to said limited part of the frangible portion to apply force thereto; and means mounted on said pivot means operable independently of said force applying means for locking said valve in opened position.

3. A valve, comprising: a tubular body defining an axially extending passage; a transverse disc member closing said passage, said member having a peripheral margin sealed in the wall of said passage, said margin being inwardly bounded by a circumferentially extending frangible section; means mounting the portion of said disc lying within said frangible section for rotation about a pivotal axis to an opened position upon rupture of the frangible section; and means for generating and applying a concentrated force against said disc at a point adjacent the frangible section to rupture said frangible section and release said portion of said disc for movement to an opened position, said force applying means being mounted on said body in a position adjacent to a portion of said frangible section to apply force to such portion.

References Cited in the file of this patent
UNITED STATES PATENTS

| | | |
|---|---|---|
| 1,225,865 | Schneible | May 15, 1917 |
| 2,120,695 | Dlesk | June 14, 1938 |
| 2,438,672 | Margrave | Mar. 30, 1948 |
| 2,515,068 | Young | July 11, 1950 |
| 2,852,037 | Downing | Sept. 16, 1958 |
| 2,973,009 | Kazyaka | Feb. 28, 1961 |
| 3,038,485 | Hosek | June 12, 1962 |
| 3,039,482 | Goldberg | June 19, 1962 |